May 24, 1927.
A. H. STEBBINS
1,629,593
DUST EXTRACTING UNIT
Filed June 9, 1925
2 Sheets-Sheet 2
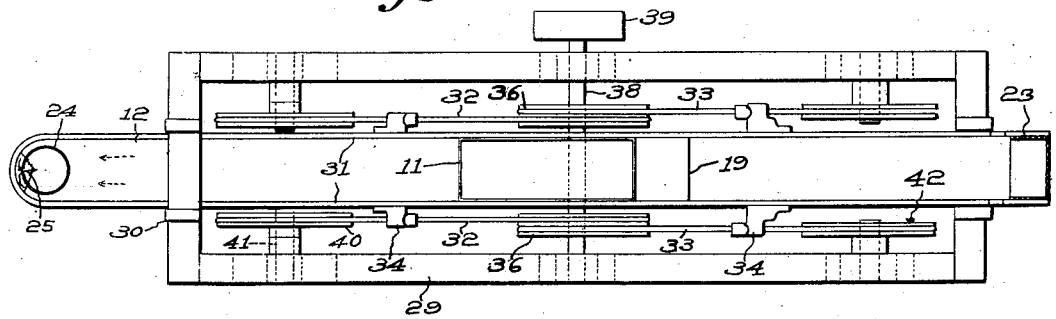
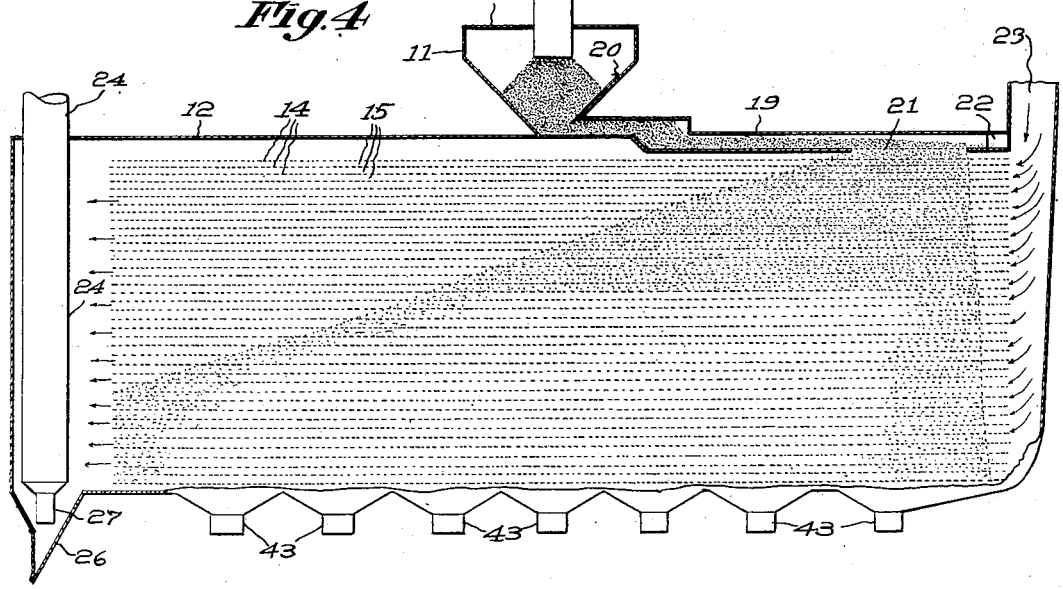
INVENTOR:
Albert H. Stebbins
BY Robt. P. Harris,
ATTORNEY Patented May 24. 1927.

1,629,593

UNITED STATES PATENT OFFICE.

ALBERT H. STEBBINS, OF LOS ANGELES, CALIFORNIA.

DUST-EXTRACTING UNIT.

Application filed June 9, 1925. Serial No. 35,913.

This invention relates to a dust extracting unit consisting of a plurality of air separators connected in series to form a closed circuit.

In the separation of ores and other materials that have been reduced to a finely divided state it is often desirable to remove the very fine dust-like particles from the slightly heavier or coarser dust-like particles. To effect a complete separation of these fine materials it is necessary to subject them repeatedly to a gentle separating force, as the desired separation cannot be effected by a single treatment because if the force employed is strong enough to remove all of the very fine particles it will also remove more or less of the slightly coarser particles.

Air is commonly employed in effecting the separation of these fine materials and various advantages are obtained by using the same air over and over again in separating the materials.

One important feature of the present invention therefore resides in a material separating receptacle that is constructed to provide a large number of air passages disposed one above the other for subjecting the materials time and time again to the gentle separating action of air currents moving thru the various passages, and to a closed circuit construction for passing the same air repeatedly thru said receptacle.

Another feature of the invention resides in a closed circuit including different dust removing receptacles and provided with a by-pass conduit for by-passing part of the air around one of the dust removing receptacles.

Other features of the invention and novel combination of parts in addition to the above will be hereinafter described in connection with the accompanying drawings which illustrate one good practical embodiment of the invention.

In the drawings:—

Fig 3 is a top plan view of the separator of Fig. 2; and

Fig. 4 is a longitudinal vertical sectional view thru the material treating receptacle of Fig. 3.

Figure 1:
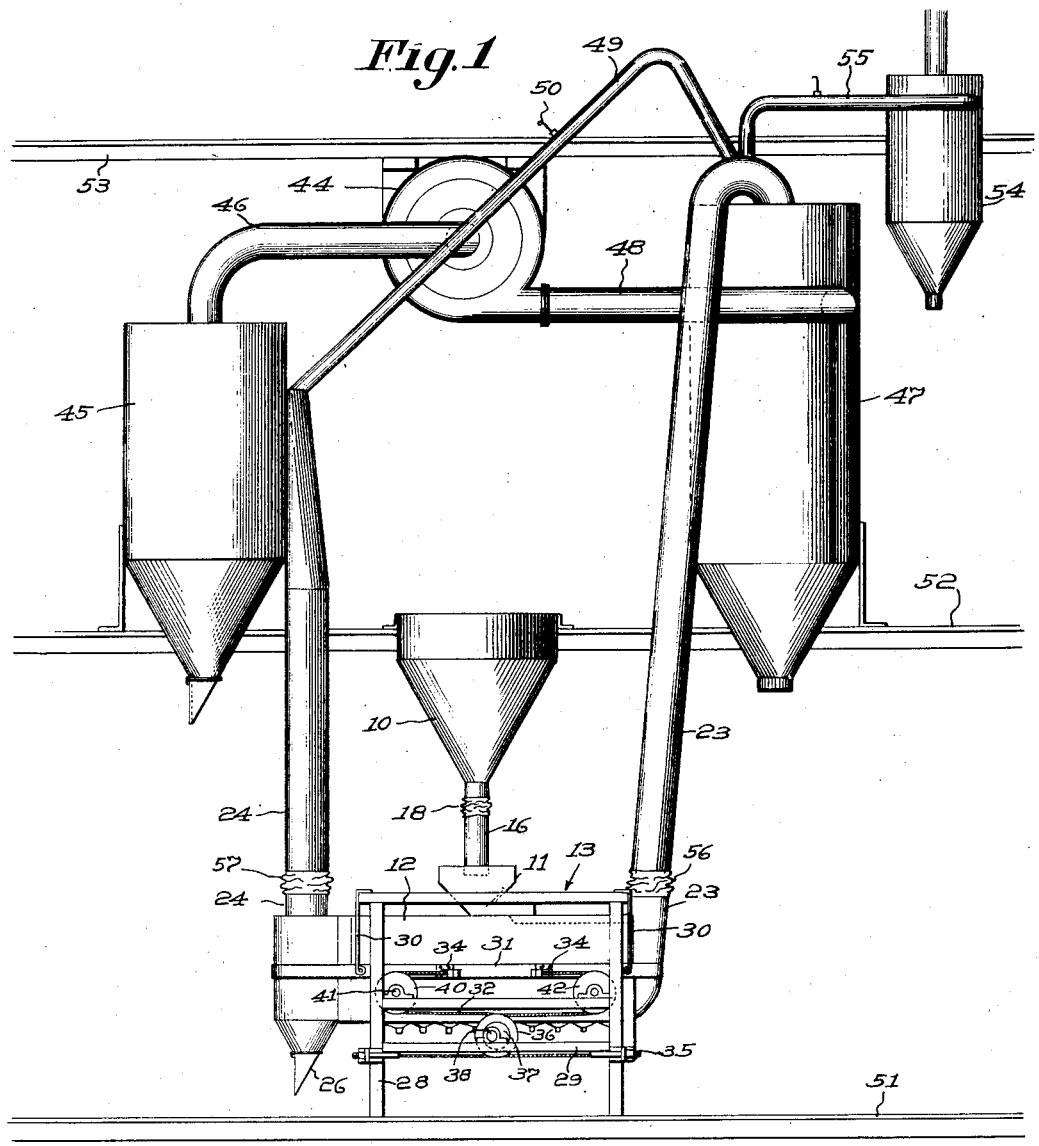
Fig. 1 is a side elevation of a dust extracting unit constructed in accordance with the present invention.
Figure 2:
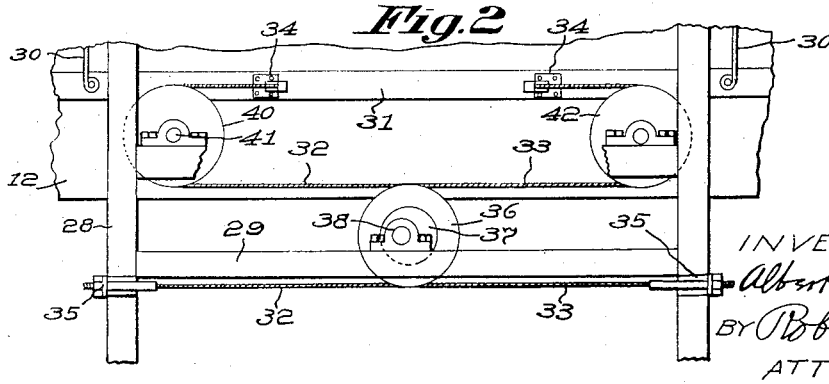
Fig. 2 is an enlarged side view of portion of one of the separators shown in Fig. 1.

In the embodiment of the invention shown, the finely divided materials to be treated are delivered by a storage or feed bin 10 to a hopper 11 mounted upon the closed casing 12 of the first separator 13 of the dust extracting unit.

As previously stated, it is difficult to separate very fine dust-like particles from slightly heavier or coarser particles and the separator 13 is therefore constructed so that the fine materials passing therethru will be subjected time and time again to the gentle separating action of relatively weak air currents. To this end the casing 12 is preferably given the elongated construction shown and may be formed of sheet metal or other material that will make the casing air tight.

Within the casing 12 are mounted a multiplicity of substantially horizontal surfaces 14 positioned one above the other in close proximity to each other throughout the height of the casing to form the longitudinally extending air passages 15. The surfaces 14 may constitute screens thru which the materials may pass as they move downwardly within the casing across the various air passages 15, but it is not essential in all embodiments of the invention that the surfaces 14 constitute screens as other constructions may be provided for presenting the materials successively to the different air passages 15.

In order to prevent particles of dust from escaping from the fine materials delivered to the hopper 13 the feed bin 10 is preferably provided with a pipe 16 extending into the hopper 11 thru the hopper cover 17, and a flexible connection 18 may be provided between the bin 10 and pipe 16 to accommodate the vibratory movement which is imparted to the casing 12. Leading from the feed hopper 11 is a closed trough 19 mounted on top of the casing 12 and the flow of the materials from the feed hopper to this trough may be controlled by adjusting the gate 20. The bottom of the trough 19 is provided near the right-hand end of the casing 12 with an opening thru which the materials may pass into the casing, and this opening is covered with a screen 21, the mesh of which should be finer than the mesh of the screens 14 within the casing 12 so that any materials that pass thru the fine screen 21 will pass freely thru the various screens 14, without clogging these screens.

The coarse materials which fail to pass thru the screen 21 may escape thru an opening 22 formed in a side wall of the casing at its right-hand end.

As the materials within the casing 12 pass downwardly thru the various screens 14 they are subjected to the gentle action of air traveling in a left-hand direction thru the various passages 15. The operating air is supplied to the right-hand end of the casing 12 by a conduit 23, the delivery end of which is constructed to supply air to the various passages thruout the height of the casing 12, and air is removed from the left-hand end of the casing 12 by a suction pipe 24 having an intake slot 25 formed in the wall that faces away from the screens 14 so that the air is caused to pass around the conduit 24 before it enters the slot 25, this being desirable to prevent air from rushing directly into the suction pipe 24.

The casing 12 is constructed to form a chamber about the suction pipe 24 in which the heavier materials that are suspended in the air may settle and move downwardly into the hopper 26 disposed below the lower end of the pipe 24, and the materials which settle in the pipe 24 may escape thru the reduced end 27 of this pipe into the hopper 26.

It is desirable to impart a simple vibratory movement to the casing 12 to promote the passage of the materials thru the various screens 14, and in the construction shown the casing is supported for vibratory movement by a frame provided with uprights 28 connected by longitudinally extending beams 29, and the casing 12 is suspended within this frame by straps 30, the lower ends of which are secured to bars 31 rigidly secured to the opposite sides of the casing 12.

Various means might be provided for imparting vibratory movement to the casing 12, and in the construction shown cables 32 are provided at the opposite sides of the casing to pull the same in a left-hand direction, while similar cables 33 at the opposite sides of the casing serve to pull the casing in a right-hand direction. One end of each of the cables is secured to a bracket 34 fastened to the side beam 31 of the casing, and the opposite end of each cable is secured to the supporting frame as at 35. The cables 32 and 33 are actuated by grooved sheaves 36 mounted upon eccentrics 37 which are actuated by a main driving shaft 38 having an operating pulley 39. The cables 32 pass from the grooved sheaves 36 about idler sheaves 40 supported at the opposite sides of the casing by stub shafts 41, and the cables 33 pass about similar sheaves 42. The arrangement is such that the eccentrics 37 rotate within the sheaves 36 to cause the latter to alternately pull and slack off the cables 32 and 33 to thereby impart a back and forth vibratory movement to the casing 12.

Since the air passes thru the passages 15 in a left-hand direction, it will carry the lighter materials lengthwise of these passages as they pass downwardly thru the casing, as indicated by the fan-like disposition of the dotted lines in Fig. 4. The heavier materials which are not carried entirely thru the passages 15 by the air currents will accumulate in the various discharge hoppers 43 at the bottom of the casing.

It may be difficult to completely remove the very fine materials which remain suspended in the air that passes out of the casing 12 thru the suction pipe 24 and for this and other reasons it may be desirable to use the separating air over and over again within the casing 12. The separator 13 is therefore shown in Fig. 1 as forming part of a dust extracting unit having a closed circuit in which a fan 44 is included. This fan serves to exhaust air from the pipe 24. It may be desirable to remove the heavier particles suspended within the air before the air reaches the fan 44 because of the destructive action of coarse particles on the parts of the fan. In the construction shown a suction dust extractor 45 of any well known or preferred construction is therefore provided between the casing 12 and the suction side of the fan 44. The upper end of the suction pipe 24 is shown as leading into a side wall of the dust extractor 45 and the upper end of this dust extractor is connected to the suction side of the fan by a conduit 46.

After the air has passed thru the fan 44 it may be desirable to further remove the dust suspended therein before the air is returned to the separator 13, and in the construction shown a blast dust extractor 47 of any well known or preferred construction is shown as interposed between the separator 13 and the blast side of the fan. The conduit 48 leads from the discharge side of the fan 44 to the dust extractor 47 and the air which has passed thru this dust extractor is returned to the casing 12 thru the conduit 23.

From the foregoing it will be seen that the separators 13, 45 and 47 are included in a closed circuit and that the fan 44 serves to produce a continuous flow of air thru these various receptacles. In some cases it may be desirable to reduce the volume of air which passes thru the casing 12, and in order that this may be done without affecting the operation of the dust extractors 45 and 47, a by-pass conduit 49 is provided leading from the discharge opening of the dust extractor 47 to the intake opening of the dust extractor 45, and the volume of air passing thru this conduit may be controlled by adjusting the valve 50. This by-pass conduit in many cases is highly desirable because it permits the volume of air passed thru the receptacle 12 to be increased or decreased as desired without correspondingly increasing or decreasing the volume of air passing thru the separators 45 and 47. In this manner each of the separators 45 and 47 may be supplied with the volume of air which will cause it to operate most efficiently, irrespective of the strength of the air that is employed in the receptacle 12.

In the construction illustrated the separator 13 is shown as mounted upon one floor 51 of a building, while the feed bin 10 and dust extractors 45 and 47 are supported by a second floor 52, and the fan 44 is shown as supported by a third floor 53. In some cases it may be desirable to discharge part of the air within the closed circuit above mentioned, and a relief dust extractor 54 is therefore shown as connected to the discharge end of the dust extractor 47 by a conduit 55, and this relief dust extractor will serve further to remove the dust from the air before it is discharged into the atmosphere. Since vibratory movement is imparted to the casing 12 the conduits 23 and 24 should be provided with flexible connections 56 and 57 near their lower ends to accommodate this vibratory movement.

From the foregoing it will be seen that as the fine materials pass downwardly thru the numerous surfaces or screens 14, they will be subjected time and time again to the general separation action of the air moving thru the passages 15. This will serve to completely remove the very light dust-like particles without carrying off the slightly heavier particles. The screens 14 do not serve to screen or grade the materials but retard the movement of the materials downwardly thru the casing that they may be thoroughly subjected to the action of the air, and since the same air is used over and over again, neither the dust or values that may remain suspended in the air is permitted to escape.

What is claimed is:—

1. A material separating and dust extracting unit, comprising in combination, at least three separate receptacles connected in a closed circuit and including a suction dust extractor, a blast dust extractor and a separator positioned between the two dust extractors, means for delivering the materials to be treated to the separator, a fan included in said circuit at a point between the two dust extractors and operable to force the air repeatedly around said circuit through the different receptacles, and a by-pass conduit arranged to by-pass part of the air from one side of the closed circuit to the other without passing through said separator.

2. A material separating and dust extracting unit, comprising in combination, at least three separate receptacles connected in a closed circuit and including a separator and two dust extractors, means for delivering the materials to be treated to the separator, a fan included in said circuit and operable to force the air repeatedly around said circuit through the different receptacles, and a by-pass conduit arranged to by-pass part of the air from one side of the closed circuit to the other without passing through said separator.

3. A material separating and dust extracting unit, comprising in combination, at least three separate receptacles connected in a closed circuit and including a separator and two dust extractors, means for delivering the materials to be treated to one of the separate receptacles to thereby introduce the materials into said closed circuit, a fan included in said circuit and operable to force the air repeatedly around said circuit through the different receptacles, and a by-pass conduit arranged to by-pass part of the air from one side of the closed circuit to the other without passing through said separator.

4. A material separating and dust extracting unit, comprising in combination, at least three separate receptacles connected in a closed circuit and including a separator and two dust extractors, means for delivering the materials to be treated to one of the separate receptacles to thereby introduce the materials into said closed circuit, a fan included in said circuit and operable to force the air repeatedly around said circuit through the different receptacles, a by-pass conduit arranged to by-pass part of the air from one side of the closed circuit to the other without passing through said separator, and a valve in said by-pass conduit for varying the strength of air in the dust extractors without varying the strength of the air in the separator.

In testimony whereof, I have signed my name to this specification.

ALBERT H. STEBBINS,